US008538358B1

(12) United States Patent
Steinbrecher

(10) Patent No.: US 8,538,358 B1

(45) Date of Patent: Sep. 17, 2013

(54) SYSTEM AND METHOD FOR DIGITALLY CONTROLLING THE LAUNCH OF HIGH-POWER BROADBAND RADIO FREQUENCY WAVES WITH HIGH LINEARITY

(75) Inventor: Donald H. Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/471,581

(22) Filed: May 15, 2012

(51) Int. Cl.
*H01Q 11/12* (2006.01)
*H04B 1/04* (2006.01)

(52) U.S. Cl.
USPC .......................... 455/127.1; 455/260; 455/333

(58) Field of Classification Search
USPC ................ 455/127.1, 127.2, 127.3, 255–260, 455/333
See application file for complete search history.

(56) References Cited

U.S. PATENT DOCUMENTS

| | | | | |
|---|---|---|---|---|
| 6,023,603 | A * | 2/2000 | Matsubara | 725/69 |
| 6,549,754 | B1 * | 4/2003 | Miller et al. | 455/3.02 |
| 8,374,660 | B1 * | 2/2013 | Steigerwald et al. | 455/575.5 |
| 2005/0064827 | A1 * | 3/2005 | Schumacher et al. | 455/115.1 |
| 2006/0121933 | A1 * | 6/2006 | Ikeda | 455/550.1 |

* cited by examiner

*Primary Examiner* — Nhan Le

(74) *Attorney, Agent, or Firm* — James M. Kasischke; Michael P. Stanley

(57) ABSTRACT

An apparatus for digitally controlling the launch of high-power broad-band RF waves with high linearity for use with a software defined air-interface system. A wave launcher contains an Eplane array containing a plurality of Epixel partition elements is configured with a master digital controller. The master digital controller processes all signals to be launched as RF waves and develops the digital images necessary for digital synthesizers to format the signals to be converted to analog. A plurality of digital-analog converters coupled with power amplifiers convert the digital signal to analog, and the analog signal is then sent to the partition elements to be transmitted as RF waves.

13 Claims, 8 Drawing Sheets

SYSTEM AND METHOD FOR DIGITALLY CONTROLLING THE LAUNCH OF HIGH-POWER BROADBAND RADIO FREQUENCY WAVES WITH HIGH LINEARITY

STATEMENT OF GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

This patent application is related to U.S. Pat. No. 6,466,167 B1 entitled ANTENNA SYSTEM AND METHOD FOR OPERATING SAME, filed Jul. 30, 2001; U.S. Pat. No. 7,250,920 B1 entitled MULTI-PURPOSE ELECTROMAGNETIC RADIATION INTERFACE SYSTEM AND METHOD, filed on Sep. 29, 2004; U.S. Pat. No. 7,420,522 B1 entitled ELECTROMAGNETIC RADIATION INTERFACE SYSTEM AND METHOD, filed on Sep. 29, 2004; U.S. application Ser. No. 13/134,957 entitled METHOD FOR ENABLING THE ELECTRONIC PROPAGATION MODE TRANSITION OF AN ELECTROMAGNETIC INTERFACE, filed on May 31, 2011; and Ser. No. 13/236,871 entitled INTERFACE BOARD CONNECTOR, filed on Sep. 20, 2011. The listed patents and patent applications are hereby incorporated by reference in their entireties.

BACKGROUND TO THE INVENTION (1) Field of Invention

The present invention relates to the field of radio transmissions, specifically technology for launching digitally synthesized, broad-band, multi-function signals that propagate as radio-frequency (RF) waves.

(2) Description of the Prior Art

It is known in the art that the air interface properties of gain and effective aperture are related to each other by a defined ratio. If the effective aperture is increased by a factor of two; the gain will also increase by a factor of two.

The effective aperture of a "transmitting" White Nail Eplane of the present invention (referencing the baseline of the Steinbrecher patents below) is equal to the product of the number of transmitting "Epixels" and the effective aperture of one Epixel. Thus, when the number of transmitting Epixels is doubled; the gain increases by a factor of two so that the Effective Isotropic Radiated Power (EIRP) of the transmitter is increased by a factor of four. First, the input power to the aperture is doubled because the number of transmitting Epixels is doubled because the number of transmitting Epixels is doubled, and, second, the aperture gain is doubled because the effective aperture is doubled. The result is that the far-field spatially combined EIRP (which is the product of the input power and the gain) increases by a factor of four. In this transmitting mode, a fully populated Eplane emulates a digital-to-analog converter (DAC) because each Epixel emulates one Voltage Least Significant Bit (VLSB).

In order to better understand the White Nail architecture in regard to the transmitter mode; it is necessary to note the operation of the conventional digital-to-analog converter (DAC). The output voltage of a 8-bit DAC comprises 2exp(8) or 256 VLSBs. Thus, an Eplane with 256 Epixels can emulate in the spatially-combined far field the performance of an 8-bit DAC. However, in actual practice, only 128 Epixels are necessary to emulate an 8-bit DAC in the spatially combined far field because the phase associated with each Epixel can be either UP or DOWN, which is a difference of 180 degrees.

The output of a DAC is an output voltage that is dependent on the digital "word" applied to the input. The output voltage is measured in VLSB. Thus, the output voltage of an 8-bit digital-to-analog converter will comprise a voltage staircase with 256 steps—each of which is equal to one VLSB.

The staircase concept is commonly used to describe quantized voltage signals in that there is a one-to-one correspondence between an input digital word and a specific step on the staircase. The voltage staircase generally extends in positive and negative directions from zero. For example, consider a 4-bit DAC in which 0000 results in an output voltage of 0 Volts and in which the left most bit is a "sign bit".

In further description, 1001 results in an output voltage of +1 VLSB and 0001 results in an output voltage of −1 VLSB. Similarly, 1010 and 0010 results in +2 VLSB and −2 VLSB respectively; 1011 and 0011 results in +3 VLSB and −3 VLSB and so on up to 1111 and 0111 corresponding respectively to +7 VLSB and −7 VLSB. Thus, the staircase has fourteen steps and the peak-to-peak output voltage of the DAC is 14 VLSB. One bit is reserved for the sign bit and zero VLSB is assigned to both 1000 and 0000.

By using this code assignment, the sign bit determines the phase of a RF signal applied to a plurality of Epixel amplifiers with the remaining bits determining how many Epixels will be energized to achieve that level of the staircase in the far field of the White Nail Eplane. Since the instantaneous output is measured in Volts, the instantaneous power delivered to the analog stage is proportional to the square of the number of VLSBs present at this instant. As will be shown, a property related to the White Nail transmitter is that the instantaneous EIRP in the far field of the transmitter is proportional to the square of the number of energized Epixels at that instant.

The following patents and patent applications referenced by the inventor, Dr. Don Steinbrecher, support the structure and operation of the present invention.

U.S. Pat. No. 6,466,167 B1, entitled ANTENNA SYSTEM AND METHOD FOR OPERATING SAME, teaches digital signal processing algorithms that are used to create digital images using the energy segments captured by the White Nail partitioned air interface. A method using an observable signal injected into the signal paths describes a means for phase alignment across the partitioned White Nail air interface—known as an Eplane. The patent discloses an antenna apparatus comprising an array of partition elements that form a plurality of effective aperture segments. The patent describes a system operating in a receive mode to capture RF signals incident on the air interface of the antenna apparatus. An observable signal containing a low-frequency component and a high-frequency component is generated and injected into the signal path associated with each Epixel. The observable signal passes through the same signal path as the RF energy captured by the associated Epixel and can later (in the digital process) be used to establish a phase reference at the phase center of each Epixel for the RF energy captured by that Epixel. In this way, the energy captured by a plurality of Epixels can be re-assembled in the digital domain as representative of the RF energy incident on the air interface containing the plurality of Epixels.

U.S. Pat. No. 7,250,920 B1, entitled MULTI-PURPOSE ELECTROMAGNETIC RADIATION INTERFACE SYSTEM AND METHOD, teaches the method for using the partitioned White Nail air interface in applications where the radar cross-section of the air interface is a system parameter.

The patent discloses an electromagnetic radiation interface system that is suitable for use with propagating radio waves. A surface is provided with pluralities of electrically-conductive partition elements that are sometimes referred to as "bristles". The partition elements form a plurality of small effective apertures that are referred to as Epixels. Each Epixel captures a portion of the incident-propagating electromagnetic waves. Each energy portion captured by an Epixel is coupled to a transmission line that is associated with that Epixel and thereby forms the beginning of a signal path that is unique to one Epixel. At some point in the signal process, each unique signal path passes through a single analog-to-digital converter; thereby forming a plurality of digital signal data streams equal in number to the number of Epixels in the partitioned White Nail interface.

U.S. Pat. No. 7,420,522 B1, entitled ELECTROMAGNETIC RADIATION INTERFACE SYSTEM AND METHOD, teaches the partitioned White Nail air interface concept and method for determining the properties of the partitioned energy capture areas. The patent discloses an energy-efficient system for RF signal acquisition that is described as a software-defined air-interface system. The technology of the system is also referred to as White Nail. The White Nail system utilizes partition elements that partition the air interface, which is called an Eplane into a plurality of segments called Epixels which are used to capture portions of RF signals that are incident on the air interface. The portions of the RF signals that are captured by the Epixels are processed individually and may be re-assembled in the digital domain to create a digital image of the incident RF signal set. When the White Nail air interface is used in a transmit mode to launch electromagnetic waves, each Epixel is created separately and then transmitted independently. The Epixel signals are collectively combined in the far field to form a radio-frequency beam.

U.S. application Ser. No. 13/134,957 entitled METHOD FOR ENABLING THE ELECTRONIC PROPOGATION MODE TRANSITION OF AN ELECTROMAGNETIC INTERFACE teaches a method used by the partitioned White Nail air interface to capture the signal segments that are created by the partitions. Typically, a White Nail Eplane may be partitioned into one hundred Epixels, each of which has two RF ports where the two orthogonal polarization vector components appear. These two hundred signal components are captured by two hundred balanced transmission lines that connect the signals to circuits that process the signals.

Specifically, the patent discloses a propagating mode transition system that provides a transition from a free-space-propagating electromagnetic energy field, which is partitioned by an array of elongate elements, to a transverse electromagnetic-mode propagating energy field in a balanced transmission line. Electrically-conductive pads are disposed on a substrate with the pads being arranged in spaced-apart fashion. Each pad is substantially covered by and electrically coupled to one of the elongate elements at a base thereof such that portions of each pad not covered by the base are exposed. Each of a plurality of transmission line baluns extends through the substrate with one end thereof disposed between the exposed portions of two adjacent pads. Each balun includes two identical-width electrical conductors with each conductor being electrically coupled to one of the exposed portions.

U.S. application Ser. No. 13/236,871 entitled INTERFACE BOARD CONNECTOR, improves upon the previous reference (U.S. application Ser. No. 13/134,957) in that a interface connector is claimed that will allow removal and replacement of the signal capture boards so that electronic circuits can be placed directly on the signal capture boards. This greatly increases the potential applications and significantly improves the performance of the White Nail capture system.

Specifically, the patent discloses an interface board connector includes a plurality of individual conductive partition element seats. Each partition element seat includes four spring fingers that extend into apertures in a dielectric base plate. Two adjacent spring fingers form a tweezers-like connector in one of the apertures that couples to a trace on a balun board contact post to form an impedance-matched extension of the balanced transmission line that is an integral part of the adjacent partition element seats. Each spring finger includes distinct sections. A ramp section allows the balun board, when inserted, to push apart the spring fingers and slide into place. The contact sections of two adjacent spring fingers form the electrical junction between the balanced transmission line traces on the balun board contact post and the section of balanced transmission line formed by the parallel spring sections of the two adjacent spring fingers.

SUMMARY OF THE INVENTION

It is a general purpose and primary objective of the present invention to provide a system for enabling electromagnetic transmissions including and related to wireless communications, satellite communications, and radar.

It is a further objective of the present invention to provide a system that digitally synthesizes complex waveforms with high linearity by utilizing a plurality of efficient, low-power amplifiers operating in a constant envelope mode.

It is a still further objective of the present invention to provide a transmitter that relates to the White Nail partitioned aperture architecture with the potential to achieve a high primary power-to-EIRP efficiency that may exceed 84% with available technology.

It is a still further objective of the present invention to provide an electromagnetic wave launching system that is based on the properties of the White Nail interface system wherein a far-field EIRP is proportional to the square of the number of energized Epixels in a White Nail Eplane thereby permitting synthesis of complex waveforms with high linearity by utilizing a plurality of efficient, low power amplifiers operating in a constant envelope mode.

To attain the objectives described, a digitally controlled transmitter is provided that is based on and adaptable to the White Nail platform. The characteristics of the White Nail architecture allow a digital-to-analog conversion and power amplification to be combined as a more power efficient transmitter system. Two specific transmit mode configurations are described: 1) a high efficiency mode in which the gain proportional to number of transmitting Epixels plays an important role and 2) a different mode in which a fixed plurality of amplifiers feed a fixed number of Epixels. In these modes, the power from a plurality of excited Epixels is combined in the far field of the air interface. This mode of operation is particularly suited to transmitting quadrature amplitude modulated (QAM) RF carriers with high efficiency. QAM is a very efficient and popular form of modulation used in wireless communications.

A unique property of the transmitter is that the far-field EIRP increases as the square of the number of energized Epixels when the output powers of each of the Epixel energizing amplifiers are equal to each other. The functionality of a fully populated Eplane of Epixels is closely related to the functionality of a conventional digital-to-analog converter. It follows that the amplifiers used to energize each Epixel can operate in a constant envelope mode with demonstrated DC-RF conversion efficiencies as high as 90%. Amplifiers of this type with efficiencies greater than 50% are readily available in low-cost packages for use in hand-held wireless communication devices. These modest efficiency, low-cost amplifiers are easily adaptable to the White Nail transmitters that are the subject of this application. The efficiency of these constant envelopes amplifiers may be compared to the less than 20% efficiency of linear Class A amplifiers used in conventional wireless transmitters.

It is well known that the air interface properties of gain and effective aperture are related to each other by the ratio ($4\pi/\lambda^2$), which is equal to the ratio of gain-to-effective aperture. Thus, if the effective aperture is increased by a factor of two; the gain will also increase by a factor of two. The effective aperture of a transmitting White Nail Eplane is equal to the product of the number of transmitting Epixels and the effective aperture of one Epixel. Thus, when the number of transmitting Epixels is doubled; the gain increases by a factor of two and the driving power also increase by a factor of two so that the EIRP of the transmitter increases by a factor of four.

The effective aperture of each Epixel is determined by the spacing of the Epixel partition elements that populate the White Nail Eplane. The partition elements are equally spaced on a square grid pattern. Each Epixel effective aperture is approximately equal to the square of the partition element grid spacing. For example, if the horizontal and vertical spacing of the partition elements is one inch, then the approximate effective aperture of one Epixel is one square inch.

The radiation pattern generated by a radially symmetric effective aperture that is uniformly energized comprises a main beam that is characterized by a conical shape. The apex angle, Theta or θ, of the cone is called the 'beamwidth' of the main beam. The range of Theta is established by the effective aperture of the air interface that launches the main beam.

For the White Nail air interface, the effective aperture is approximately the product of the number of active Epixels and the effective aperture of one Epixel. For example, if a single Epixel has an effective aperture of 10 square centimeters and the Eplane has a maximum of 128 active Epixels; then the effective aperture of the Eplane is $128\times10=1280$ square centimeters. Thus, the beamwidth, Theta, of a White Nail transmitter is determined by the effective aperture of the White Nail Eplane.

A simplified embodiment of the invention can be used to explain the operation of the White Nail transmitter. In the embodiment, the driver associated with each Epixel comprises a digital-to-analog converter followed by a linear, Class A power amplifier. A more efficient embodiment combines the digital-to-analog conversion process in order to enable the use of constant envelope amplifiers. The amplitude of a transmitted wave form is controlled by reducing or increasing the signal level to each Epixel power amplifier. This control utilizes linear amplifiers that operate at efficiencies typically less than 20%. In this embodiment, the amplitude of the transmitted wave is controlled by reducing or increasing the number of energized Epixels. Since each amplifier is either ON or OFF in the embodiment, the amplifiers can operate in a constant envelope mode, which can be as high as 90% efficient—according to published research reports.

TERMS OF ART

Figure 1:
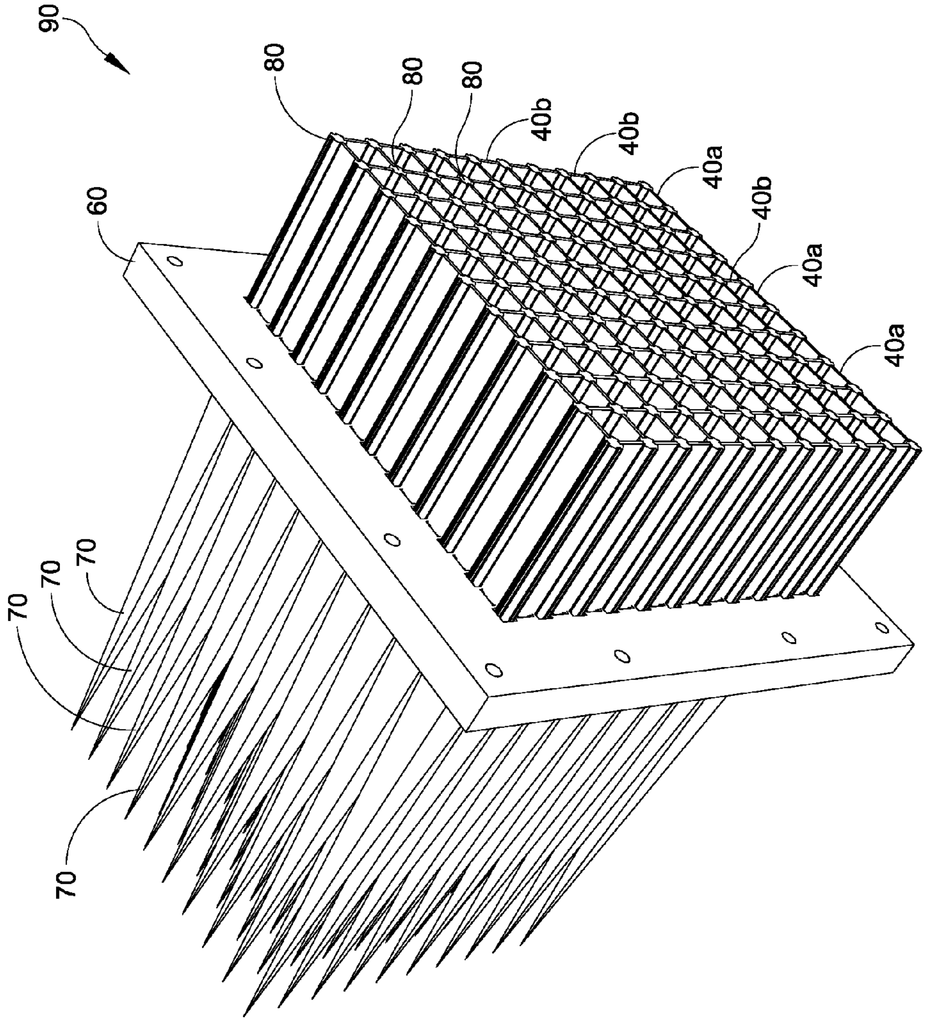
FIG. 1 illustrates an exemplary Eplane array.

As used herein, the term "Effective Isotropic Radiated Power" or "EIRP" refers to spatially combined energy generated by the launch of RF waves by energized Epixel partition elements. The term "Eplane array" refers to a transmitter air-interface surface containing at least one partition element coupled to a horizontal-polarization circuit board and a vertical-polarization circuit board. The term "master digital controller" means a device that processes signals to be launched as radio frequency (RF) waves and develops digital images based on processed signals. The term "software-defined air-interface system" or "SDAI system" refers to a software defined RF-signal transmission system.

DETAILED DESCRIPTION OF INVENTION

For the purpose of promoting an understanding of the present invention, references are made in the text to exemplary embodiments of a system and method for digitally controlling the launch of high-power, broad-band, RF waves with high linearity. It should be understood that no limitations on the scope of the invention are intended by describing these exemplary embodiments.

One of ordinary skill in the art will readily appreciate that alternate but functionally equivalent methods and systems for digitally controlling the launch of high-power, broad-band, RF waves with high linearity may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, the drawings emphasize the principles of the invention. In addition, in the embodiments depicted herein, reference numerals in the various drawings refer to identical or near identical structural elements.

FIG. 1 illustrates an exemplary Eplane array 90. In the embodiment shown, the array 90 contains a plurality of Epixel partition elements 70, horizontal circuit boards 40*a*, and vertical circuit boards 40*b*. Each partition element 70 corresponds to one horizontal circuit board 40*a* and one vertical circuit board 40*b*. The horizontal circuit boards 40*a* and vertical circuit boards 40*b* are secured by circuit board support rails 80. A base plate 60 provides a secure transition from the partition elements 70 to the horizontal and vertical circuit boards 40*a*, 40*b*. The support rails 80 are configured to secure at least two circuit boards 40*a*, 40*b*. In some positions, the support rails 80 may secure three or four circuit boards 40*a*, 40*b*.

As illustrated, the partition elements 70 are configured to launch radio frequency (RF) waves, with the energy of the RF waves being spatially combined to generate significantly more EIRP than that generated by a single Epixel partition element 70. Each partition element 70 also has a frequency-independent effective area approximately equal to the physical area of the partition element. The physical area of one Epixel is a square defined by the element-to-element spacing of the Epixel partition elements, which defines the edge dimensions of the Epixel square physical area. Experiments have verified that the element-to-element spacing of the partition elements is scalable over a range greater than 100:1, as measured in fractions of wavelength.

In the exemplary embodiment shown, the array 90 contains one hundred partition elements 70, with the appropriate number of circuit boards 40*a*, 40*b*, and circuit board support rails 80. In further embodiments, the array 90 may contain more or fewer partition elements 70.

Figure 2:
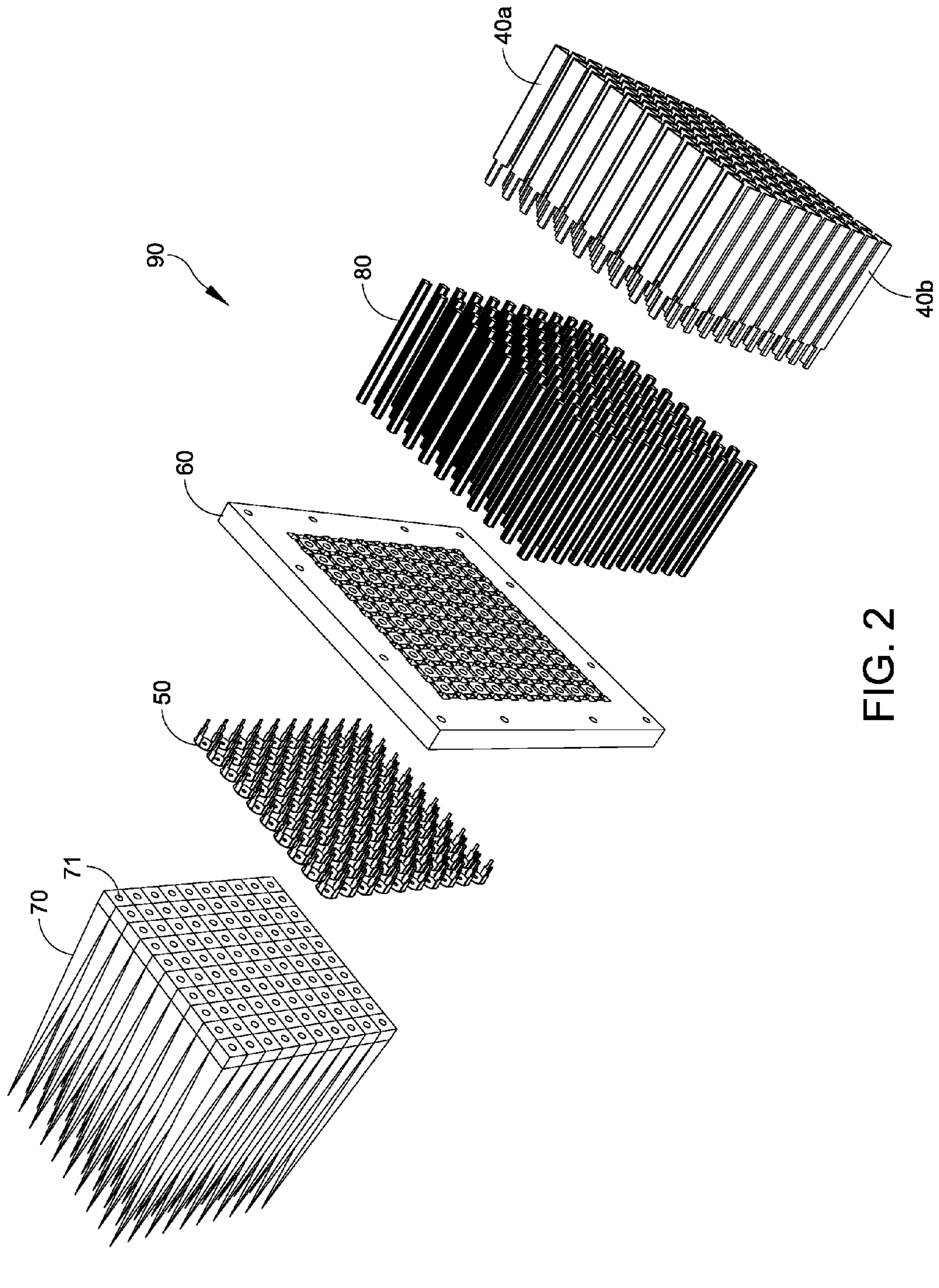
FIG. 2 is an exploded view of the exemplary array.

FIG. 2 is an exploded view of the array 90. As illustrated, each partition element 70 includes a partition element bolting aperture 71 and a spring clip 50 (See FIG. 3). When connecting the partition elements 70 to the base plate 60, a bolt goes through the base plate, the spring clip 50 and then into the partition element bolting aperture 71 to secure and fasten the partition element to the base plate. The circuit board support rails 80 also secure to the base plate 60 to hold the horizontal and vertical circuit boards, 40*a*, 40*b*, to the base plate.

Figure 3:
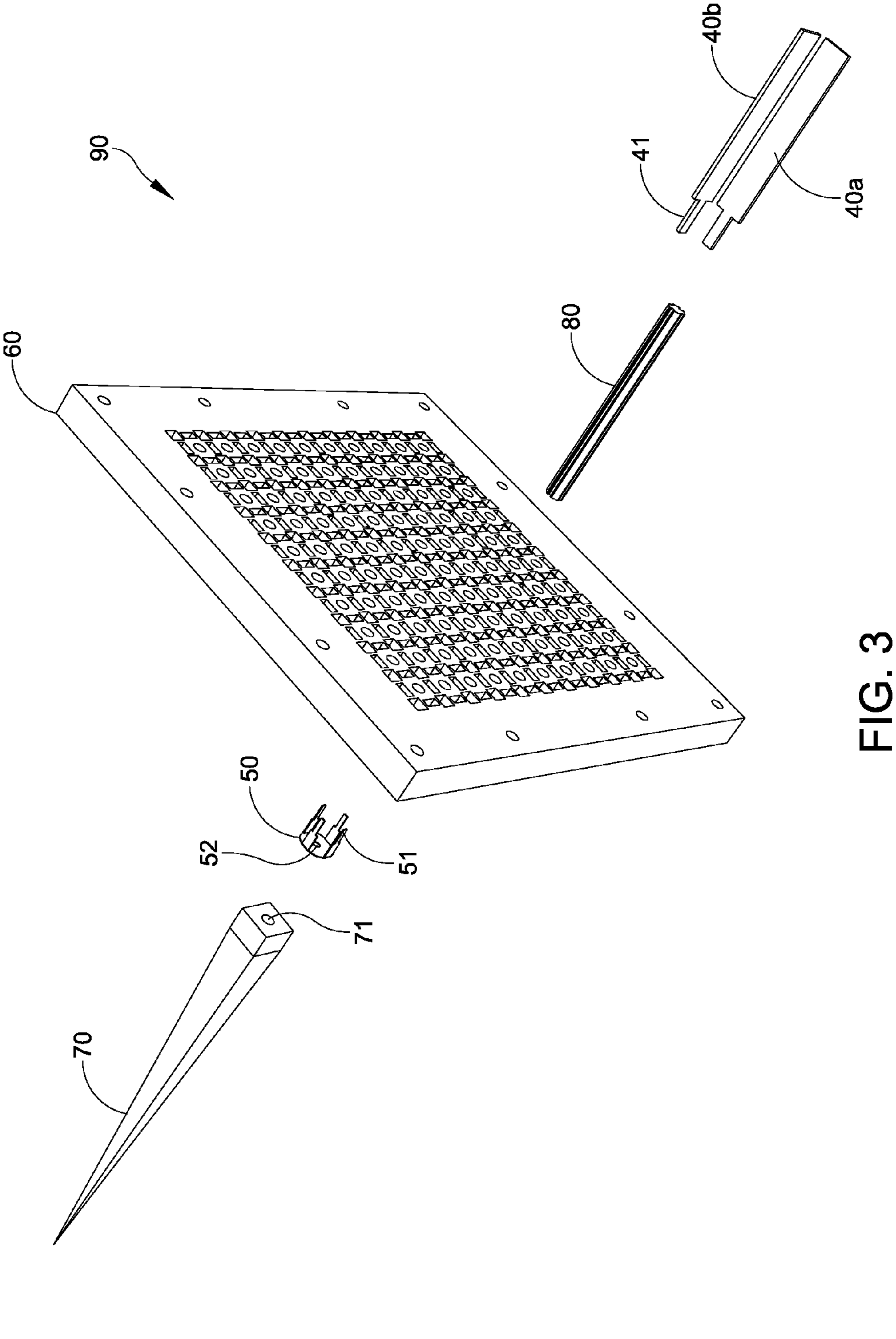
FIG. 3 is an exploded view of a single Epixel partition element for the array.

FIG. 3 is an exploded view of a single partition element 70 for the array 90. The partition element bolting aperture 71 corresponds to a spring clip aperture 52 on the spring clip 50. A securing bolt (not shown) is able to pass through the base plate 60, the spring clip aperture 52 and the bolting aperture 71 to secure the partition element 70 to the base plate 60.

The spring clip 50 also contains spring clip protuberances 51. When the spring clips 50 are next to one another, adjacent spring clip protuberances 51 secure to a corresponding aperture on the base plate 60 to create a slot connection for one circuit board, which may be either the horizontal circuit board 40*a* or the vertical circuit board 40*b*. Each circuit board terminates in a balanced transmission line that mates with the protuberances on adjacent spring clips to form a balanced transmission line transition to adjacent partition elements. The circuit board support rail 80 also supports the circuit boards 40*a*, 40*b*. The circuit boards 40*a*, 40*b* each have a circuit board tongue 41, which is slid into the slot connection created by the spring clip protuberances 51.

Figure 4A:
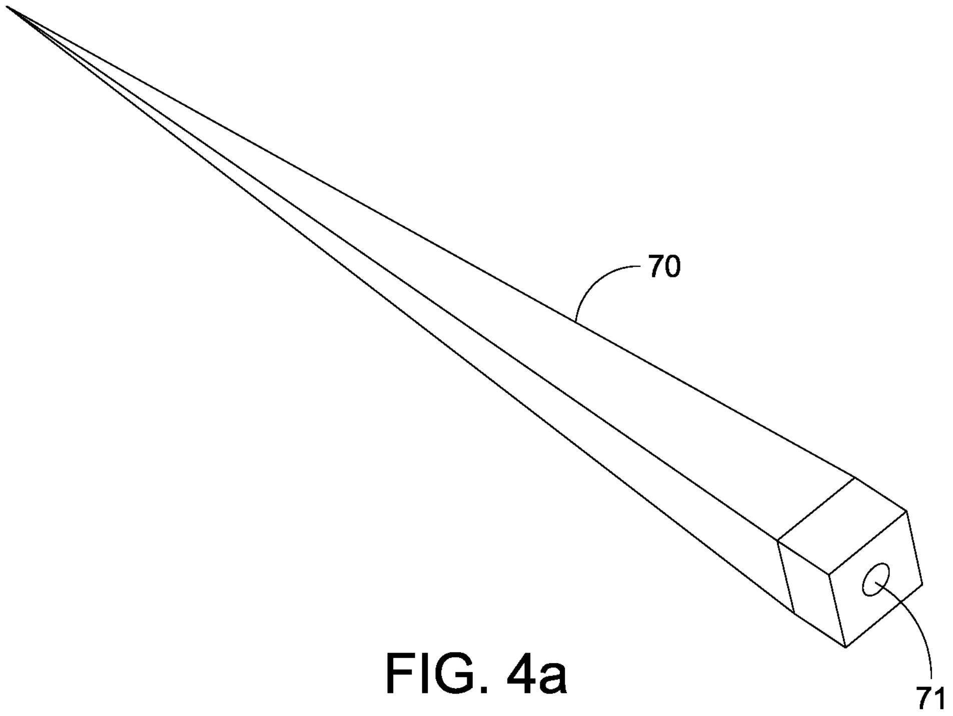
FIG. 4*a* is an exemplary partition element.

FIG. 4*a* is an exemplary Epixel partition element 70, illustrating the partition element bolting aperture 71. In further embodiments, the partition element 70 may be configured to secure to the base plate 60 using other securing structures, including, but not limited to, clips, clasps, protuberances, contours, pins, braces, and combinations of these structures.

As illustrated in FIG. 4*a*, the partition element 70 is square pyramidal, with a cubic or rectangular prism base containing the bolting aperture 71. In further embodiments, the partition element bolting aperture 71 may be directly on the square pyramidal partition element 70.

Figure 4B:
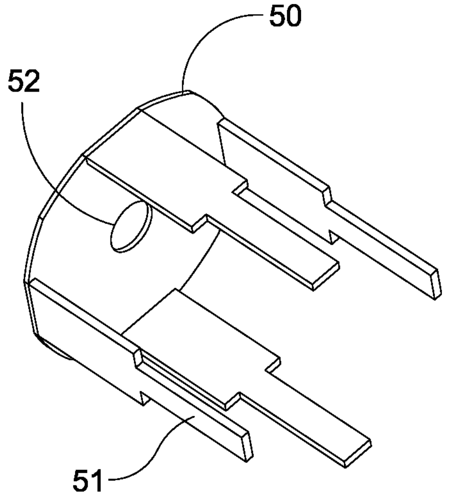
FIG. 4*b* is an exemplary spring clip.

FIG. 4*b* is an exemplary spring clip 50 with a spring clip aperture 52. In the embodiment shown, the spring clip 50 contains four spring clip protuberances 51, which correspond to spring clip securing apertures 61*b* on the base plate 60.

The spring clip protuberances 51 contain a wide frontal portion with a thinner rear projection. When assembled with the base plate 60; the wider frontal portions project through the spring clip securing apertures 61*b* to form a transmission line segment, while the thinner rear portions may project through spring clip securing apertures to overlap with the printed-circuit transmission lines on the circuit boards 40*a*, 40*b*. In this way, a transmission line transition is formed that guides the RF signal generated on the circuit board onto the radiating surfaces of the partition elements 70.

Figure 4C:
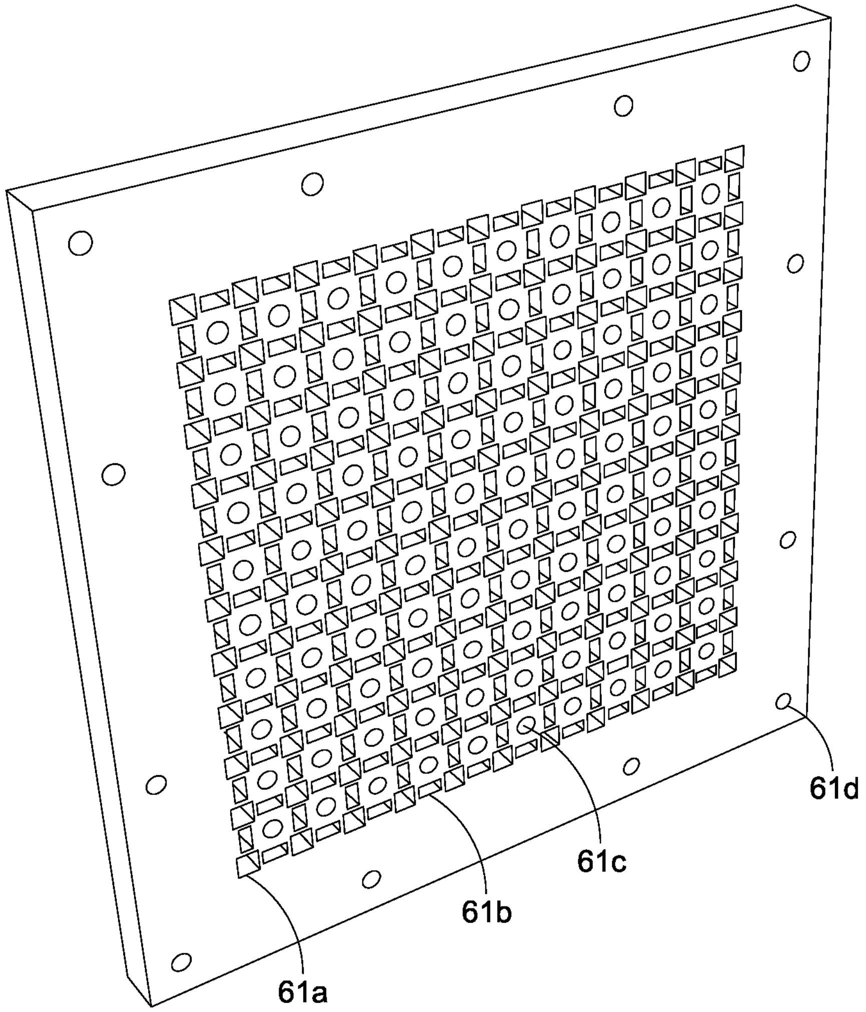
FIG. 4*c* is an exemplary base plate.

FIG. 4*c* is an exemplary base plate 60. As illustrated, the base plate 60 contains four types of apertures 61; circuit board support rail apertures 61*a*, the spring clip securing apertures 61*b*, bolt apertures 61*c* and base plate fastener apertures 61*d*. The circuit board support rail apertures 61*a* are configured to receive and secure circuit board support rails 80.

The spring clip securing apertures 61*b* are arranged in a grid-like pattern, with a single bolt aperture 61*c* in the center of each grid created by the spring clip securing apertures 61*b*. The spring clip securing apertures 61*b* are adapted to receive spring clip protuberances 51 from two adjacent spring clips 50. The spring clips 50 are therefore aligned so that the spring clip aperture 52 aligns with the bolt aperture 61*c* to allow a bolt to pass through to the bolting aperture 71 on the partition element 70.

In the exemplary embodiment shown, the bolt apertures 61*c* and the base plate fastener apertures 61*d* are adapted to receive bolts. In other exemplary embodiments, the bolt apertures 61*c* and the base plate fastener apertures 61*d* may be shaped, adapted or configured to receive any fastening or securing device known in the art, including, but not limited to, bolts, clips, clasps, pins, screws, contours and combinations of these and other fasteners known in the art.

Figure 4D:
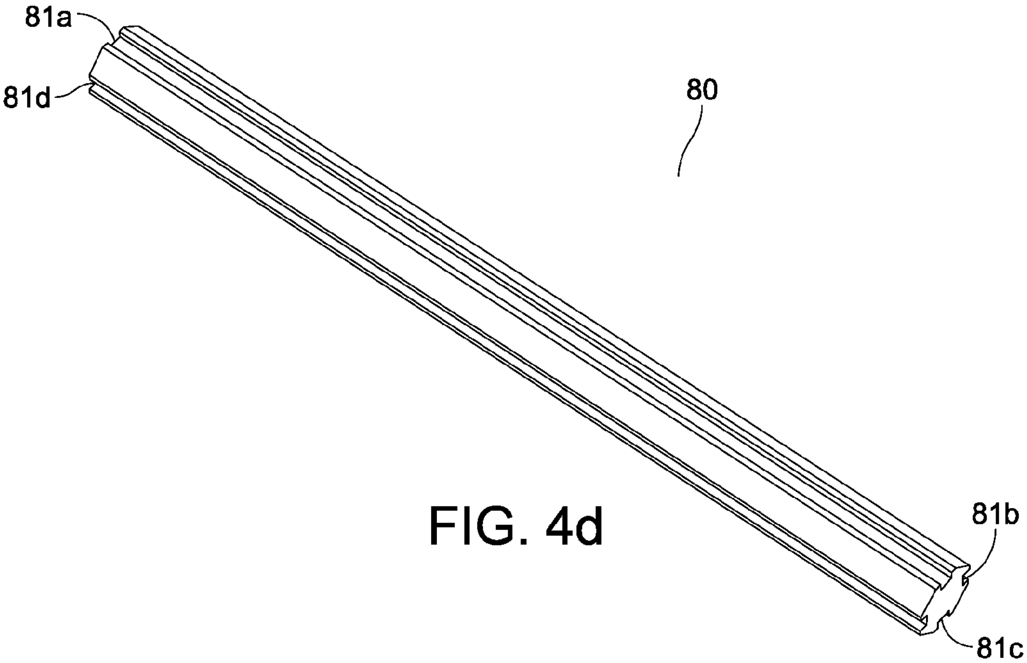
FIG. 4*d* is an exemplary circuit board support rail.

FIG. 4*d* depicts an exemplary circuit board support rail 80. Each support rail 80 is squared and contains four slots 81*a*, 81*b*, 81*c*, 81*d*, which create channels to secure the circuit boards 40*a*, 40*b* to the base plate 60. Each circuit board support rail 80 is therefore configured to secure one side of four total circuit boards 40*a*, 40*b* (as illustrated in FIG. 1). The slots 81*a*, 81*b*, 81*c*, 81*d* give the circuit board support rail 80 a cross-like appearance when viewed from an end. The circuit board support rail may be rounded or tapered.

Figure 4E:
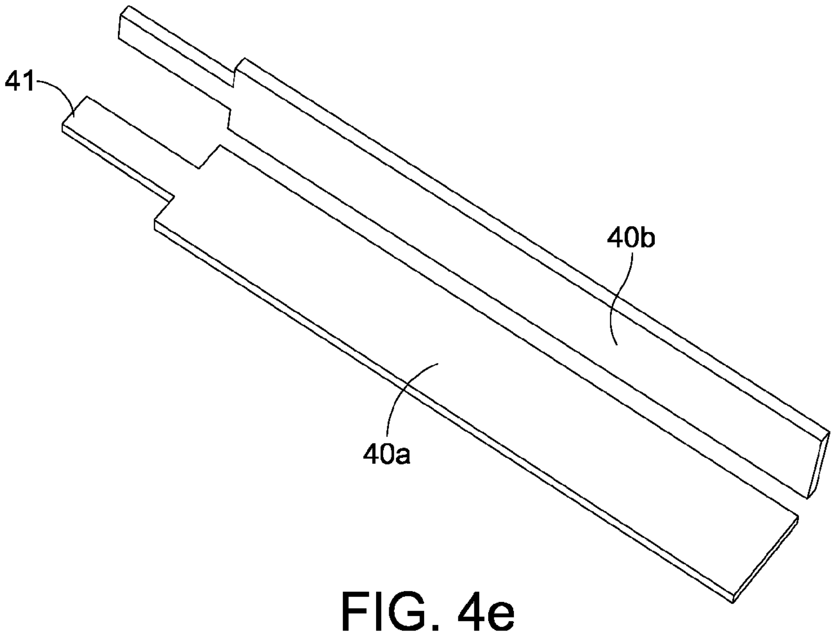
FIG. 4*e* illustrates an exemplary horizontal circuit board and vertical circuit board for the partition element.

FIG. 4*e* illustrates an exemplary horizontal circuit board 40*a* and a vertical circuit 40*b* board for an Epixel partition element 70. Each circuit board 40*a*, 40*b* contains a circuit board tongue 41, which slides between the spring clip protuberances 51 of adjacent spring clips 50 in order to secure to the base plate 60 and; thereby provide the electrical connection necessary to launch the electromagnetic signal generated on the circuit board onto the radiating surfaces of the partition elements. The circuit boards 40*a*, 40*b* may contain alternative securing structures to secure to the base plate 60 including, but not limited to, braces, clips, clasps, bolts, welded joints, contours, and combinations of these and other securing structures.

Figure 5:
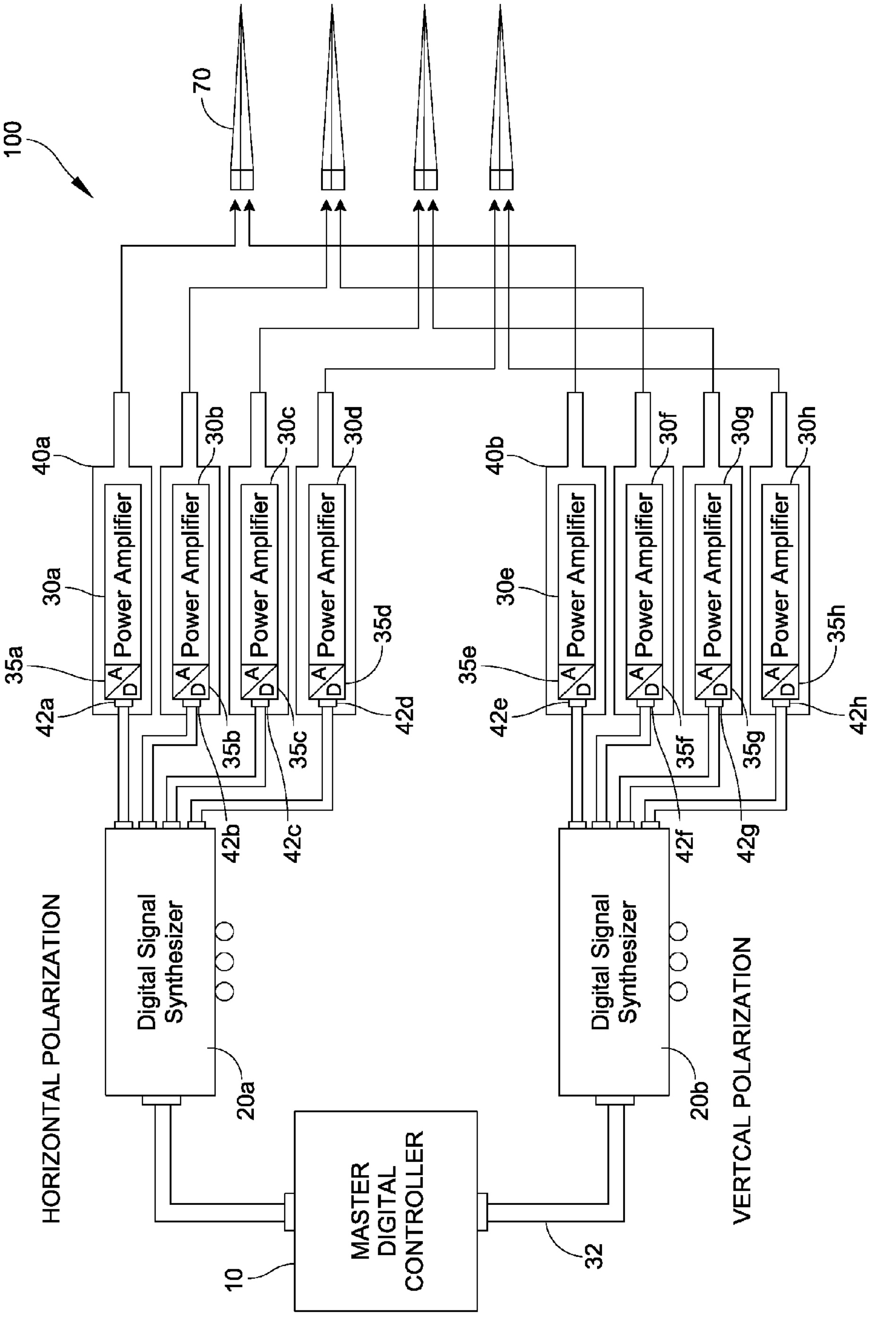
FIG. 5 is a schematic illustrating the components of a SDAI RF wave launcher system.

FIG. 5 is a schematic illustrating the components of one embodiment of a SDAI RF wave launcher system using the Eplane array 90. In the exemplary embodiment shown, a master digital controller 10 processes signals to be launched as radio frequency (RF) waves and develops digital images based on those signals. A signal cable 32 connects the master digital controller 10 to digital synthesizers 20*a*, 20*b*. The digital synthesizers 20*a*, 20*b* receive digital images from the digital master controller 10 and format the signals to be converted to analog by analog waveform synthesizers that are represented in FIG. 5 as digital-analog converters (DACs) 35*a-h*. It should be understood that the analog waveform synthesizers can be substantially more complicated than what is normally represented by the term "DAC". However, the DAC is the simplest form of a generalized waveform synthesizer and is used in the figure to represent the more general forms of a digital waveform synthesizer with the understanding that a digital input is used to generate an analog output that can be amplified and transmitted. The DACs 35*a-h* are arranged in parallel. By using multiple parallel converters, it is possible to reduce and avoid distortion.

Power amplifiers 30*a-h* increase the power of the electrical signal once converted to analog. The DACs 35*a-h* and power amplifiers 30*a*-30*h* reside on the circuit boards 40*a*, 40*b*, with the two digital signal synthesizers 20*a*, 20*b*, corresponding to the horizontal circuit boards 40*a* and the vertical circuit boards 40*b*, respectively.

All propagating electromagnetic signals are polarized. The term "polarization" refers to the orientation of the electric field vector with respect to vertical and horizontal planes. Since light is an electromagnetic wave, light is polarized and the polarization can be observed using a polarized lens. Because reflections may cancel one polarization, glare can be reduced or eliminated by viewing through polarized sunglasses. When an electromagnetic signal is transmitted from an antenna, the polarization of that signal will depend on the antenna properties.

A simple antenna launches linearly polarized waves with polarization oriented in accordance with the physical orientation of the antenna. More complicated antennas can launch elliptically polarized waves that are either left circular or right circular. In the case of linearly polarized waves, a receiving antenna should be oriented in the same polarization as the transmitting antenna since cross polarization can result in a significant loss of signal strength—which is similar to the glare reduction results observed with polarized sun glasses. It follows that a desirable property of any transmitting system is the ability to control the polarization of the transmitted signal.

The White Nail Eplane array 90 is capable of generating any desired polarization of a transmitted RF signal. This is accomplished by synthesizing two separate orthogonal vector components. The electric field vectors of these components are aligned with the vertical and horizontal components of the grid pattern that is the Eplane 90. By independently adjusting the magnitude and phase of these vector components, any static or dynamic electric field polarization can be transmitted. Linear polarization will result if the vertical and horizontal components have the same phase. Elliptical polarization will result if the vertical and horizontal components have a quadrature phase. Circular polarization will result if the vertical and horizontal components have equal magnitude and quadrature phase. The elliptical and circular polarization vectors may rotate either clockwise or counterclockwise depending on the two possible quadrature phase relationships.

The polarization of an RF signal (to be transmitted) can be controlled by synthesizing the required amplitude and phase of two orthogonal polarization vectors that may be referenced as the "horizontal polarization vector" and the "vertical polarization vector". These identifiers are chosen because the electrical field of the orthogonal vectors aligns with the horizontal and vertical grid pattern of the partition elements 70. The master digital controller 10 determines the instantaneous values of the two vector components necessary to synthesize the correct polarization of the transmitted waveform and sends those values to the digital synthesizers 20*a* and 20*b*. The digital signal synthesizer 20*a* transmits a digital replica of the desired horizontally polarized signal to the circuit boards 40*a*, while the digital signal synthesizer 20*b* transmits a digital replica of the desired vertically polarized signal to the circuit boards 40*b*.

In further embodiments, a SDAI wave launcher system 100 may contain a single digital signal synthesizer 20. In still further embodiments, additional components may reside on the circuit boards 40*a*, 40*b*. In the embodiment shown, the circuit boards 40*a*, 40*b* each contain the circuit board connectors 42*a-h*. The circuit board connectors 42*a-h* are structural and functional connections allowing signal transfer between components residing on the circuit boards 40*a*, 40*b* and components not residing on circuit boards. Once amplified, signals are sent from the circuit boards 40*a*, 40*b* to the Epixel effective aperture, which is represented by the partition elements 70.

The electromagnetic signal is launched into the transmission line formed by the space between adjacent partition elements. The electric field is oriented normal to the metal surfaces of adjacent partition elements. As a result, the horizontal circuit board 40*a* launches a horizontal electric field between adjacent partition elements and the vertical circuit board 40*b* launches a vertical electric field between adjacent partition elements.

In the embodiment illustrated in FIG. 5, the plurality of waves launched by the individual Epixel partition elements 70 becomes spatially focused and spatially power combined which increases the EIRP of the transmitted energy firstly by the number of partition elements 70 in the array 90 (not shown) and secondly by the focused gain of the partition elements.

The EIRP of the RF wave launched with the SDAI wave launcher system 100 can be measured relative to the power available at the output of one of the power amplifiers 30*a-h* feeding one Epixel partition element 70. A first reduction to practice comprised an Eplane with 32 Epixels operating at 2 GHz. The amplifiers feeding the 32 Epixel ports were each adjusted to have an output power of −5 dBW. The ratio of EIRP to the power output of one power amplifier 30*a-h* would theoretically be 15 dB (from spatially power combining 32 amplifiers) plus 10 dB (from aperture focus as determined by the effective aperture of the Eplane) or 25 dB total so that the expected EIRP was 20 dBW or 100 Watts. The actual measured EIRP in this exemplary embodiment was 94 Watts, which is less than 0.5 dB from the expected value and represents an aperture efficiency of 94%.

In further exemplary embodiments, the Eplane array 90 can be scaled to any physical area independent of the operating frequency and the resulting effective area will be approximately equal to the physical area of the array. The scalability of the array 90 is a major departure from conventional antenna theory wherein the gain and beam characteristics are independent variables and the capture area is a dependent variable. Furthermore, neither the size of the array 90, nor the size of the partition elements 70 is frequency dependent over a wide range of operating frequencies.

Figure 6:
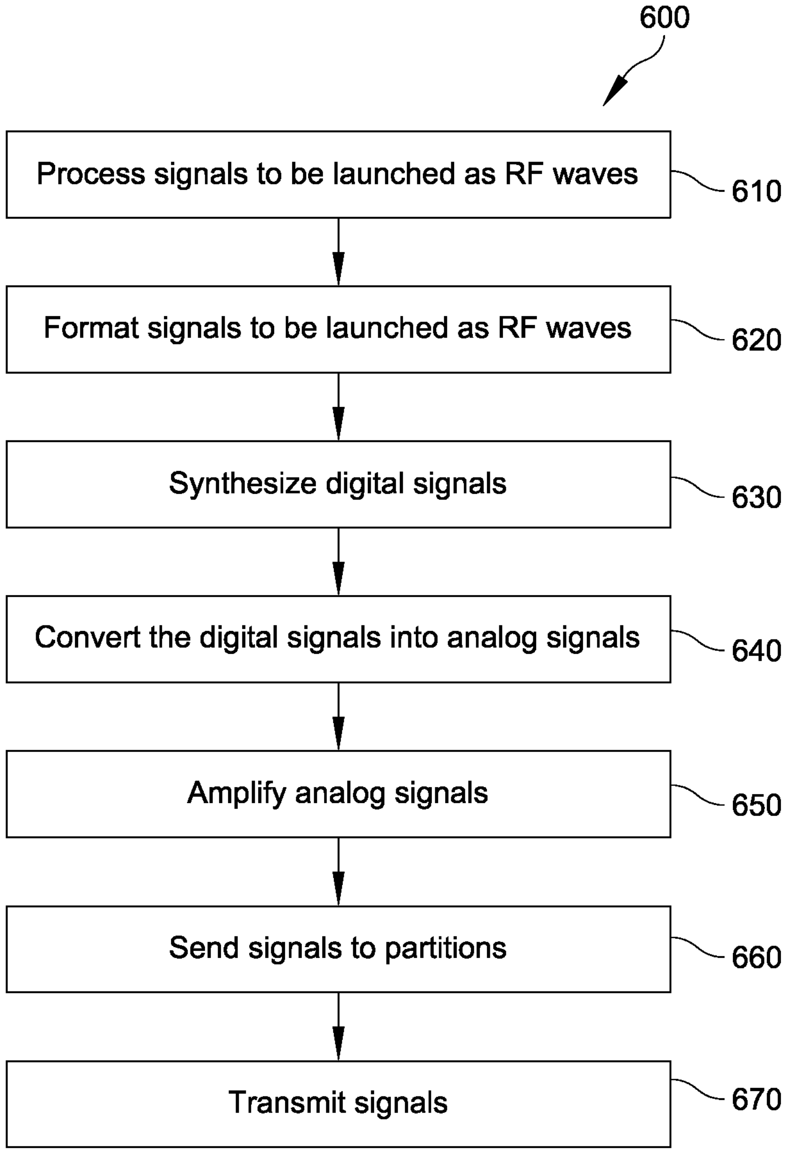
FIG. 6 is a flow chart of a method for digitally controlling the launch of radio frequency (RF) waves with high linearity.

FIG. 6 is a flow chart of a method 600 for digitally controlling the launch of radio frequency (RF) waves with high linearity. In Step 610, a master digital controller processes all signals to be launched as RF waves. Component pieces of the RF signals are processed individually and then reassembled to create a digital image of the transmitted RF signal set.

In Step 620, the signals are formatted to be launched as RF waves. The master digital controller develops the digital images necessary for the digital signal synthesizers to format the signals that are to be converted to analog by the digital-analog converters.

In Step 630, digital signal synthesizers synthesize the digital signals.

In Step 640, digital-analog converters convert the digital signals into analog signals.

In Step 650, the analog signals are amplified by the power amplifiers.

In Step 660, the analog signals are sent from the power amplifiers to the partition elements in the Eplane array.

In Step 670, the analog signals are transmitted by the partition elements. When the analog signals are received, the signals are individually processed, converted back to digital, and reassembled to create a digital image of the incident RF signal set.

It is notable that the relationship between the beamwidth and effective aperture, $A_E$, for a White Nail Eplane is approximately the same as the relationship for an ideal air interface. It is well known that the relationship between beamwidth and effective aperture for an ideal air interface is given by the equation:

$$Theta = \theta = 2\mathrm{Cos}^{-1}\left[1 - \frac{\lambda^2}{2\pi A_E}\right] \quad (1)$$

In this equation, Lambda A, is the wavelength of the transmitted radiation, and Theta θ, is the beamwidth of an ideal air interface with an effective aperture equal to $A_E$. This relationship is also generally correct for a Eplane with an effective aperture equal to $A_E$.

The equation can be solved for $A_E$ in terms of the beam width θ (required for a particular transmitter application) which will determine the required effective aperture for the Eplane and, therefore, will determine the partition element spacing in the Eplane array when the required number of Epixels is determined from a consideration of the transmitted signal quantization requirement.

For example: assume that a 3 Ghz (Lambda=10 cm) White Nail transmitter with 128 Epixels requires a beamwidth of 20 degrees (0.35 radians). According to Equation (1), the required Eplane effective aperture $A_E$ will be approximately 1048 $cm^2$, the effective aperture of each of the 128 Epixels will be approximately 8.2 $cm^2$ and the partition element spacing will be approximately 2.86 cm. If a redundant 196 Epixel square array is used, then each edge of the square array will be 40 cm (approximately 16 inches). Continuing with the example, the transmitter peak EIRP is determined when all 128 Epixels are energized. The aperture gain is determined from the effective aperture by multiplying by $4\pi/\lambda^2$ and converting to dB. The resulting gain is 21.19 dB.

The array gain is determined from the fact that 128 Epixels are energized at the same power level so that the total power is 128 times the power supplied to one Epixel. A ratio of 128 is equivalent to 21.07 dB. Thus, the peak EIRP of the transmitter is 21.19+21.07=42.26 dB relative to the power applied to each Epixel. If each Epixel is fed by a one-Watt (0 dBW) amplifier; then the transmitter peak EIRP will be 42.26 dBW (16.85 Kilowatts). As seen by this example, a White Nail Eplane transmitter can provide significant EIRP with modest power amplifiers.

In various embodiments of the invention, the effective aperture of each Epixel may be adjusted by changing the partition element spacing to meet a specific transmitter requirement. The number of Epixels and the effective aperture of each Epixel are independent variables. For example: the number of Epixels may be increased during the manufacturing process to improve the linearity of a transmitted waveform. Essentially all dimensional parameters of the White Nail interface may be changed by design to achieve specific performance goals. However, certain ratios need to remain fixed in order to ensure the correct port impedance. This dependence on ratios is similar to the dependence of transmission line impedance to the ratios of the conductor dimensions.

As previously noted, each Epixel is analogous to one VLSB in the output of a digital-to-analog converter (DAC). If the transmitted waveform linearity would require an 8-bit DAC; then the number of active Epixels in a White Nail transmitter would be less than or equal to 128. The actual number of Epixels may be larger than 128 but the maximum number of active Epixels at any instant would be 128. The added redundancy of 68 Epixels from the total of 196 Epixels would allow up to 68 active circuit failures before a degradation of transmitter performance would be observed. This added reliability is an advantage when a transmitter location is not easily accessable for maintenance.

The added redundancy of 68 Epixels allows the population of active Epixels to be selected at random from the available set of inactive Epixels. Redundancy, in this case, indicates that there are more Epixels than the number needed for transmission. The random selection process tends to average small discrepancies in the properties of the individual Epixel active circuits and to improve the linearity of the transmission process. It should be noted that the random selection process can automatically incorporate the redundancy algorithm by selecting Epixel subsets from the set of working Epixel modules. The redundancy algorithm refers to the list of working modules and randomly selects the number required for transmission at that instant from the list of working modules. Redundancy in the Epixel population provides significant transmitter reliability and performance advantages. If a unit has failed, a built-in test feature removes the unit identifier from the list of working modules.

Built-in test, BIT, functionality can keep track of the addresses of working Epixel modules. Almost all circuits used in equipment of the type envisioned use BIT circuits to track failures. In this way, redundancy can be incorporated into the design in order to allow for a set number of failures before system degradation begins to occur. The BIT circuits can be relatively simple or comprehensive depending on the system and on the potential harm of a failure. Thus, the number of Epixels in a given Eplane will be determined by the system redundancy requirement and the system linearity requirement. The linearity requirement is based on defining the number of quantization levels, VLSBs, necessary to meet a given system goal. Typically, this number is in terms of the number of bits. For example: a 4-bit system has 16 quantization levels whereas an 8-bit system has 256 quantization levels. Since each Epixel represents two quanta (VLSBs), because the RF can be either UP or DOWN, an 8-bit system will need 128 Epixels on transmit.

Restated, the EIRP in the far field of a White Nail transmitter is proportional to the square of the number of energized Epixels at that instant. Thus, a unique property of a White Nail transmitter is that each energized Epixel emulates a single VLSB in the output of a digital-to-analog converter. Furthermore, each Epixel is either switched “ON” or is switched “OFF” (as required by a digital input signal) in order to synthesize the desired analog waveform in the transmitter far field. As a result, the power amplifiers associated with each Epixel can operate in a constant-envelope mode. Operating in a constant-envelope mode is much more efficient than the Class A linear mode required by a conventional transmitter.

The White Nail system has demonstrated exceptionally high efficiency when operating in a transmit mode. In a test in an anechoic chamber, the measured power efficiency of the White Nail transmitting aperture was 94%. The efficiency measurement was carried out with a 32 Epixel Eplane populated with 32 amplifiers—each with an adjusted output power of −5 dBW at a frequency of 2 GHz. A separate measurement was performed to determine that the antenna gain of the thirty-two Epixel Eplane (at 2 GHz) was 10 dB. Since “32” represents a gain of 15 dB; the expected EIRP in the far field was −5 dBW+10 dB+15 dB=20 dBW or 100 Watts. The actual measured EIRP was 94 Watts—which can be interpreted as an aperture efficiency of 94%.

Transmitters based on the White Nail aperture may be expected to yield substantial energy savings in certain wireless applications. Since constant envelope power amplifiers with efficiencies greater than 50% are readily available; the DC-to-EIRP conversion efficiency of the White Nail transmitter can be projected to be greater than 47%. Comparable conventional transmitter systems operate with a DC-to-EIRP conversion efficiency less than 10%. For example: consider the wireless telephone industry in the United States. The total number of cell site transmitters is approximately 250,000. The EIRP associated with each transmitter is approximately 1,000 Watts so that the total EIRP for all sites is approximately 250 mega-Watts—which at 10% efficiency requires approximately 2.5 Terra-Watts of primary power. If the efficiency could be increased to 47%, then the primary power saved would be approximately 1.97 Terra-Watts.

Another unique property of the White Nail system is that the constant-envelope RF signal fed to each Epixel can be supplied with a relative phase of +1 or −1 so that only 128 Epixels are needed to emulate a 256 bit digital-to-analog converter system. Changing the phase of the constant envelope RF signal does not place any additional burden on the power amplifier. Yet another unique property of the White Nail System is that each Epixel has two separate ports corresponding to vertical and horizontal polarization vectors. Each of these ports can be fed with a unique signal so that the far field EIRP can be dynamically synthesized with any polarization—as required by the specific application.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An air-interface radio frequency wave launcher apparatus comprising:

a master digital controller;

at least one digital signal synthesizer for horizontally-polarized electric currents that is operatively coupled with said master digital controller;

at least one digital signal synthesizer for vertically-polarized electric currents that is operatively coupled with said master digital controller;

an Eplane array with a plurality of Epixel partition elements secured to a base plate, wherein each of said partition elements corresponds to at least one horizontal circuit board and at least one vertical circuit board;

at least one digital-analog converter coupled with said at least one digital signal synthesizer for horizontally-polarized currents that is operatively coupled to at least one power amplifier; and at least one digital-analog converter coupled with said at least one digital signal synthesizer for vertically-polarized currents that is operatively coupled to at least one power amplifier.

2. The apparatus of claim 1 wherein each of said plurality of partition elements corresponds to a frequency-independent effective area approximately equal to a physical area of said plurality of partition elements.

3. The apparatus of claim 1 wherein said at least one digital-analog converter coupled with said at least one digital synthesizer for horizontally-polarized currents are connected in parallel.

4. The apparatus of claim 1 wherein said at least one digital-analog converter coupled with said at least one digital synthesizer for vertically-polarized currents are connected in parallel.

5. The apparatus of claim 1 wherein each of said partition elements is operatively coupled to a corresponding horizontal circuit board and a corresponding vertical circuit board.

6. The apparatus of claim 1 wherein each of said partition elements is square pyramidal.

7. The apparatus of claim 1 wherein each of said partition elements is secured to said base plate using a bolted multi-pronged spring clip, wherein each prong is comprised of a tapered projection.

8. The apparatus of claim 1 wherein each of said bolted multi-pronged spring clips is secured to a corresponding aperture on said base plate to create a slot connection for at least one circuit board.

9. The apparatus of claim 1 wherein said horizontal circuit boards and said vertical circuit boards are secured in position by corresponding circuit board support rails.

10. The apparatus of claim 9 wherein said at least one circuit board support rail contains four supporting slots, each of said supporting slots in contact with and corresponding to the thickness and length of a circuit board.

11. The apparatus of claim 1 wherein said digital converters are comprised of integrated circuitry on said circuit boards.

12. The apparatus of claim 1 wherein said power amplifiers are comprised of integrated circuitry on said circuit boards.

13. The apparatus of claim 1 wherein said circuit boards contain structural circuit board connectors operatively coupling said circuit boards with said digital signal synthesizers.

* * * * *